Feb. 10, 1931.  W. H. SILVER  1,791,539
CULTIVATOR
Filed Jan. 5, 1927  5 Sheets-Sheet 1
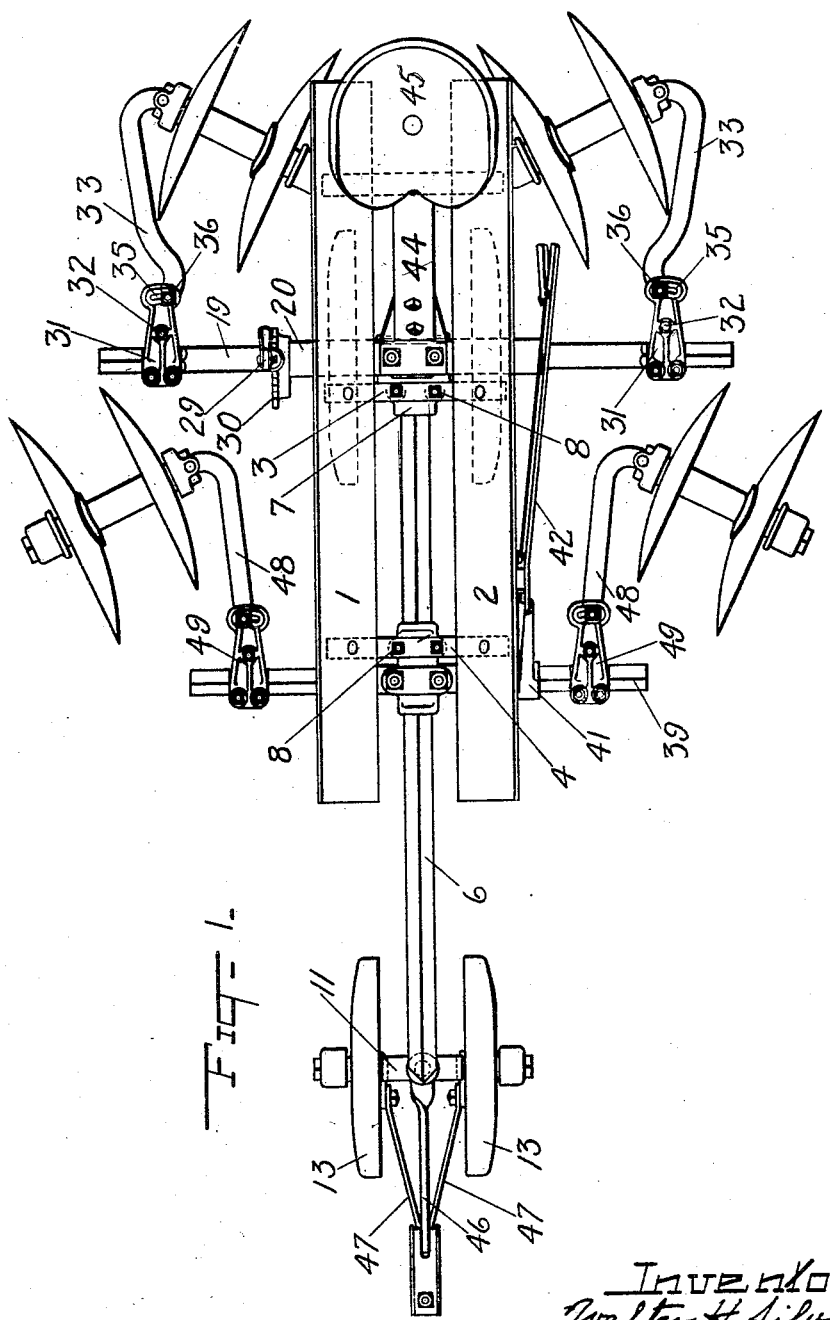

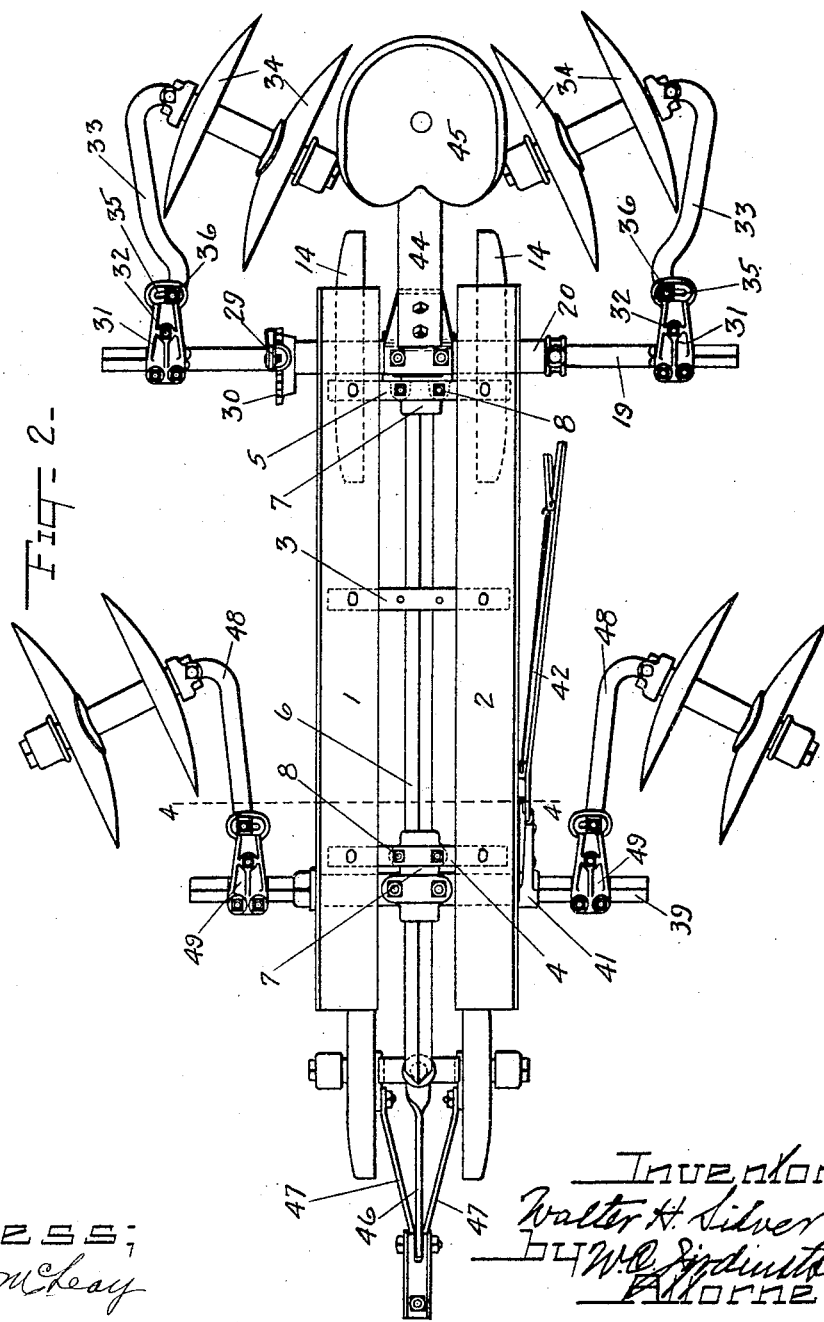

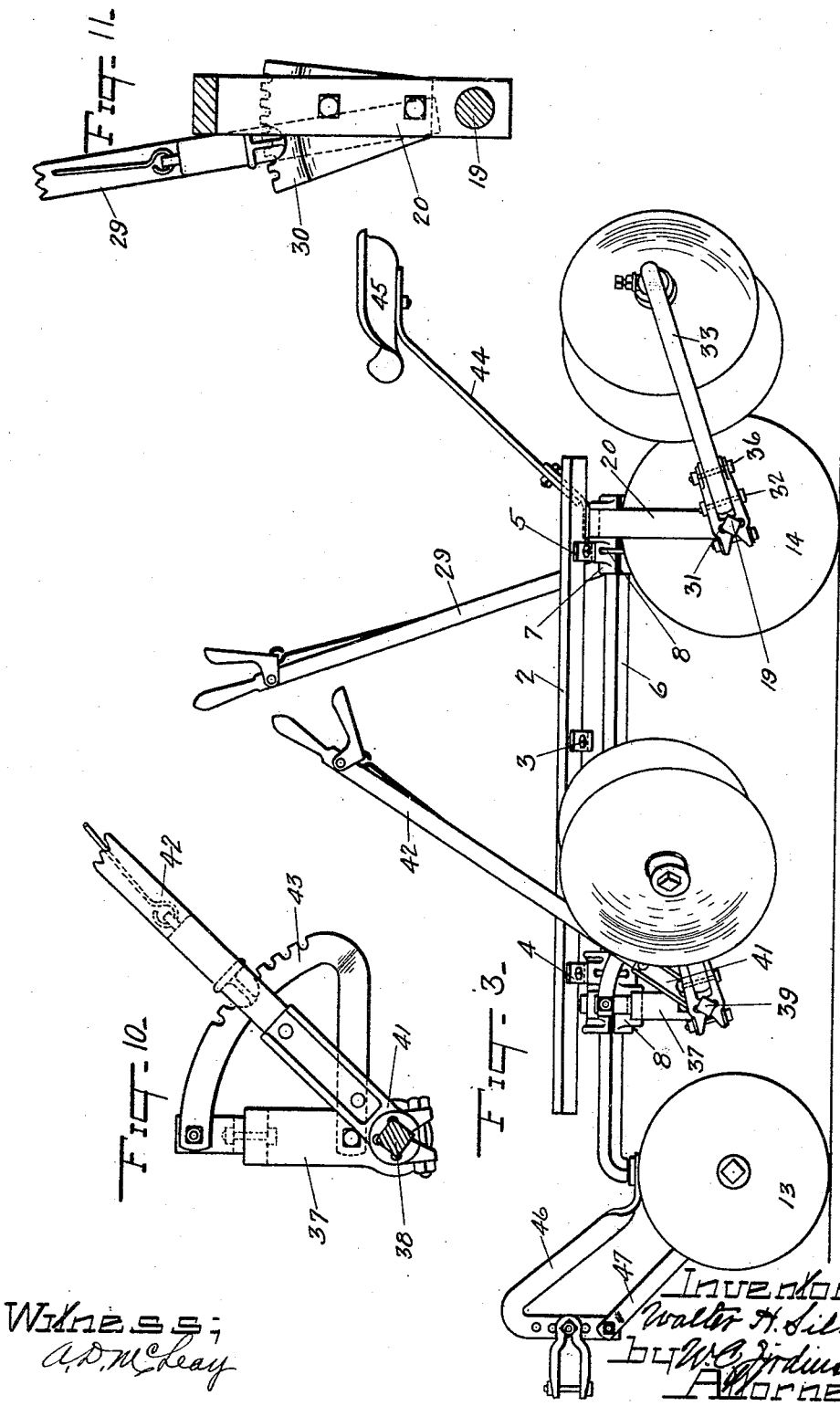

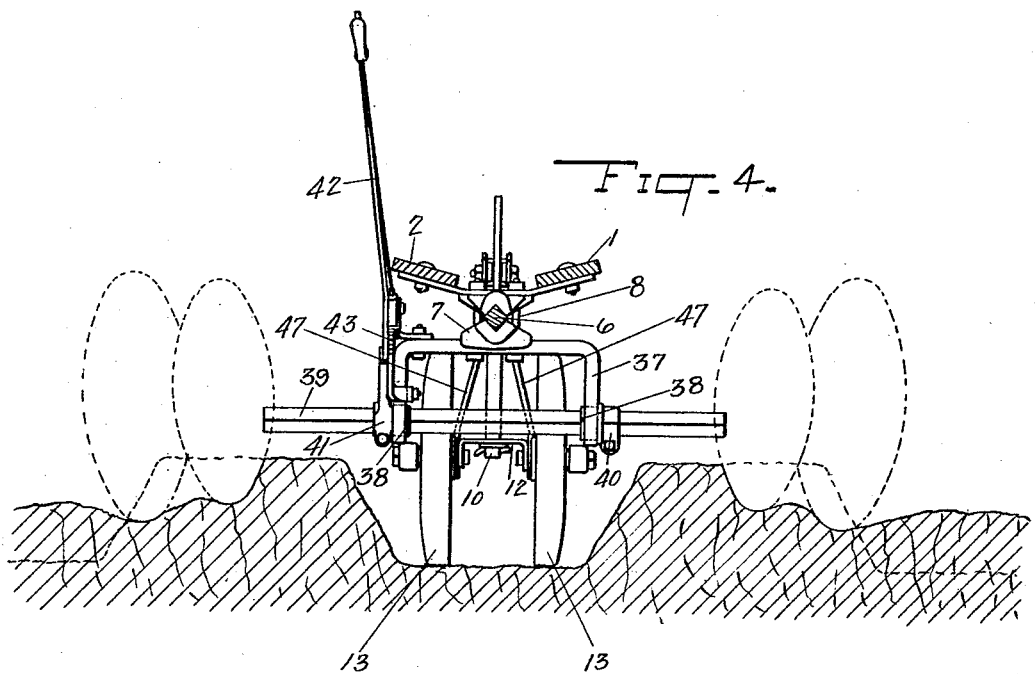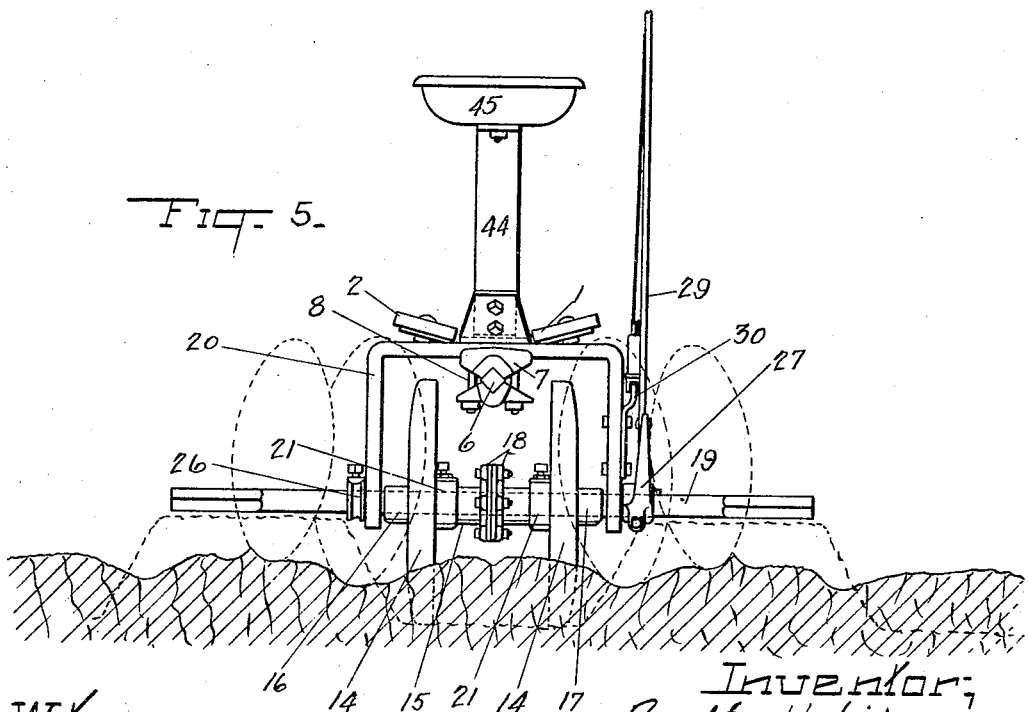

Feb. 10, 1931. W. H. SILVER 1,791,539
CULTIVATOR
Filed Jan. 5, 1927 5 Sheets-Sheet 5
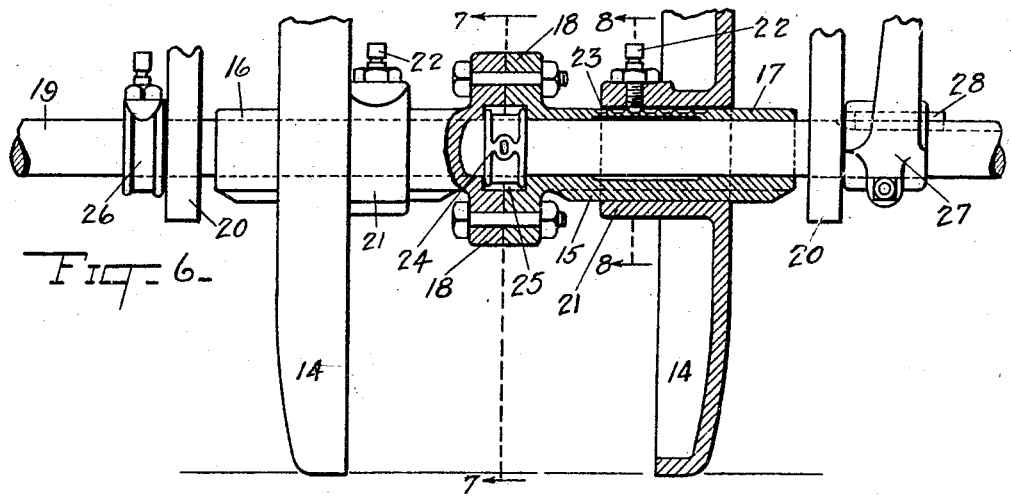
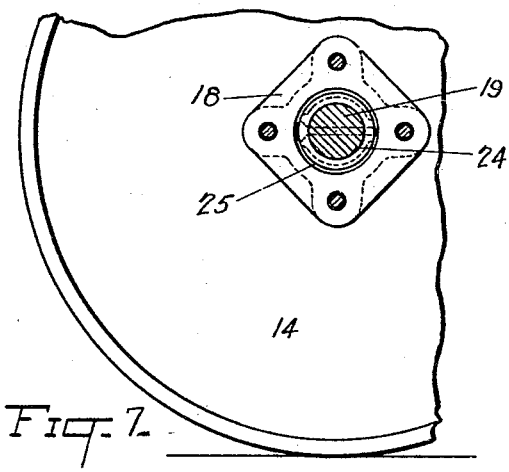
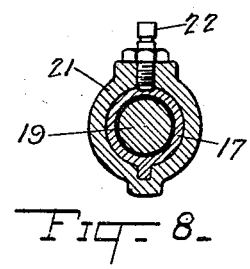
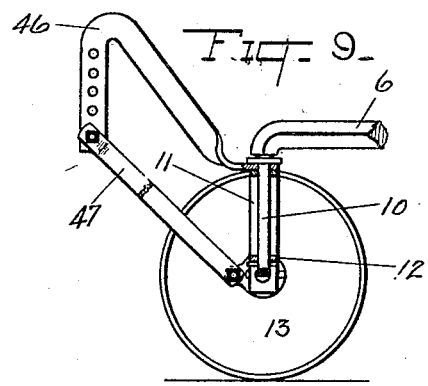

Patented Feb. 10, 1931

1,791,539

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

CULTIVATOR

Application filed January 5, 1927. Serial No. 159,044.

My invention relates to cultivators, and more particularly to that type known as ridge bursters employed in leveling ridged land, and has for its object production of such an implement having features of adjustability which add to efficiency in its operation, other objects being disclosed in the following specification.

Referring to the drawings in which similar numerals indicate identical parts:

Figure 1 is a plan view of my complete implement with the gangs of earth-working devices adjusted to operate in close proximity;

Figure 2 is similar view with the gangs of earth-working devices adjusted longitudinally of the implement to their limit apart;

Figure 3 is a side elevation of Figure 2 with the gangs of earth-working devices raised out of operative position;

Figure 4 is a section on the line 4—4 of Figure 2, looking forward, with the forward gangs of earth-working devices removed but showing in dotted lines their operation on the ridges;

Figure 5 is a rear view with the rearward gangs of earth-working devices removed, but illustrating, in dotted lines, their operation on the ridges;

Figure 6 is an enlarged fractional view, in part section, of the rear wheel mounting;

Figure 7 is a section on the line 7—7 of Figure 6;

Figure 8 is a detail section on the line 8—8 of Figure 6;

Figure 9 is a detail of the hitch device;

Figure 10 is an enlarged detail of the forward lever and its mounting, and

Figure 11 is an enlarged detail view of the rear lever and connections.

The frame comprises parallel longitudinally disposed members 1 and 2 spaced apart by bars 3, 4 and 5 to which they are bolted. A longitudinally adjustable beam 6, preferably rectangular in cross section, is supported in split bearings 7 on the bars 4 and 5, the two parts of said bearings being rigidly clamped to the beam 6 by bolts 8, which also secure the bearings to the bars 4 and 5. By loosening said bolts, the beam 6 is capable of longitudinal adjustment when desirable. The forward end of the beam 6 is bent downwardly and carries a spindle 10, which extends downwardly through a suitable opening in an arch 11 and through an opening in a smaller arch 12 secured to the lower part of the arch 11, a cotter beneath the arch 12 serving to hold the spindle in place; wheels 13, supporting the frame forwardly, are mounted on the lower part of this arch structure, and travel in the trench between the ridges.

Rearwardly the implement is supported by wheels 14 mounted on a tubular member 15, the latter composed of parts 16 and 17, each of which has a flange 18 secured, one to the other, by suitable bolts. The tubular member 15 is freely rotatable on an axle 19 journaled in the ends of a vertically disposed arch 20, which is secured to the upper part of the split bearing 7 at the rear of the implement. The wheels 14 are mounted on the tubular member 15, as stated, and are adjustably secured thereon by set screws 22 in the hubs 21 adapted to engage with any one of a series of notches 23 on the tubular member 15, as disclosed in Figure 6. The tubular member 15 is secured from longitudinal movement on the axle 19 by a collar 24 rigid on the axle and operating in a recess 25 in each of the flanged ends of the parts 16 and 17 of the tubular member.

The axle 19 is prevented from longitudinal movement by a collar 26 on the axle, outside of an arm of the arch 20, and a casting 27, outside of the opposite arm of said arch, held in place by a key 28. Attached to an arm of the casting 27 is a lever 29 provided with the usual latch to engage with notches in a segment 30 bolted to the arch 20. The end portions of the axle 19 are rectangular in cross-section, and on them are carried split couplings 31 clamped on the axle by suitable bolts. The split couplings 31 are of a common type and to them respectively are secured, by bolts 32, bars 33 which project rearwardly and outwardly for part of their length, the remaining part being bent to extend inwardly and forwardly, and journaled thereon are earth-treating devices, in this instance disks 34, arranged to throw the soil toward the center of the implement. By means of slots 35 in the couplings 31 and bolts, 36, which extend through the parts of the couplings 31 and the arms 33, the latter can be swung toward or from each other, to vary the angling of the disks, and are held in the desired position by nuts on the bolts 36.

Forwardly of the bar 4, an arch 37 is secured to the lower half of the bearing 7 by the same bolts holding the two parts of the bearing together, and rockably mounted in bushings 38 in suitable openings in the lower portions of the arms of the arch 37 is a shaft 39, rectangular in cross-section, and extending a desired distance beyond said arms. The shaft 39 is held from longitudinal movement by a collar 40 and a casting 41 secured on the shaft 39 outside of the arms of the arch 37. To an arm, preferably integral with the casting 41, is rigidly attached a lever 42 provided with the usual type of latch to engage with notches of a sector 43 mounted on the arch 37.

Arms 48, similar to the arms 33, are mounted on the end portions of the shaft 39, and are bent to extend outwardly at a sufficient angle to give the desired working position to the disks mounted thereon, which operate to throw the soil outwardly. The couplings 49, by which the bars 48 are attached to the shaft 39, are similar to the couplings 31 and the arms 48 are adjustable thereon in a manner similar to the arms 33 attached to the couplings 31.

A seat spring 44 is supported on the arch 20 and carries a seat 45 so that the position of the seat is constant relative to the rear wheels and irrespective of their adjustment. To the forward arch 11 is connected a draft device comprising a clevis formed of a bar 46 attached to the top of the arch and extending upwardly and forwardly for a desired length, and is then bent downwardly and provided with holes for attachment to the draft power; braces 47 are secured to the forward end of the bar 46 and to the ends of the arch 11.

The implement, heretofore described, is more particularly valuable for operation in ground which has been ridged by a middle breaker plow shortly after wheat or other crops have been harvested. The object of ridging the land by a middle breaker is to expose the roots of the crop harvested, and the roots of the weeds, to the action of the weather and the killing effect of exposure, for after ridging the ground is not again disturbed until it is decided to be in proper condition to be leveled in preparation for seeding, this latter operation necessitating destruction of the ridges and return of the soil to the trenches from which it was removed in forming the ridges by a middle breaker plow, and for this latter purpose of leveling the ridges my invention is particularly applicable and notably efficient.

Different conditions of soil require adjustment of the implement to be equally effective under any and all conditions. If the soil is heavy, when my implement is used, the front and rear gangs of disks are in position, relative to each other, as shown in Figures 1 and 3, but if the soil is friable and more or less covered or mixed with weeds or roots, the disk gangs are positioned relative to each other, as shown in Figure 2. The latter position is more particularly desirable if much trash or weeds are present, for sufficient space is provided between the front and rear gangs to permit clearance to right and left.

The wheels 13 and 14 travel in a trench, not only supporting the implement but operating against any tendency to lateral movement thereof. The rear wheels 14 are adjustable forwardly simultaneously with a similar adjustment of the rear gangs of disks, both being mounted on the axle 19, the rear wheels being also adjustable toward or from each other when the condition of the trenches makes it desirable. Adjustment of the rear wheels 14 and rear gangs is effected by first removing the bar 3 and the bolts securing the bar 5 to the longitudinal members 1 and 2. The bolts, by which the split bearing 7 is secured to the arch 37 and the bar 4, are loosened sufficiently to allow a free longitudinal movement of the beam 6 therein; the rear gangs are raised by operation of the lever 29; then, by actuation of the draft, the rear wheels and gangs and mountings thereof are drawn forwardly until the bar 5 is in the position formerly occupied by the bar 3, and is there bolted, after which the bolts of the forward split bearing 7 are again tightened, holding the relative position of the parts of the implement as illustrated in Figure 1. The seat spring 44 and seat 45 thereon are supported on the arch 20, and consequently move forwardly or rearwardly coincident with the adjustment thereof. By the reverse of the operation just desscribed, the implement will again be as in Figure 2. This adjustment can also be made by holding the beam rigid in the forward bearing, and after loosening the bolts of the rear bearing and removing the bar 3 and the bolts by which the bar 5 is secured to the frame members 1 and 2, the forward gangs are raised by operation of the lever 42, and by a rearward movement of the implement, the rear gangs and wheels remaining stationary, the beam will slide freely in the rear bearing 7, carrying the forward gangs and wheels rearwardly, until the bar 5 is at the position of the bar 3 when the parts can be again rigidly secured together, as previously explained.

The action of the rear gangs of disks is to turn into a trench, in which the implement is traveling, part of the ridges adjacent thereto;

the remaining parts are cut away by the forward disk gangs and turned into adjoining trenches. The depth of operation of the rear disks is regulated by operation of the lever 29 to rock the axle 19, on which the rear gangs are supported, said lever being capable of movement to raise the gangs entirely from the ground. The front gangs of disks are regulated or swung out of contact with the ground by actuation of the lever 42 to rock the axle 39 on which the forward gangs are mounted, all of the gangs being adjustable in a well known manner to take more or less ground as may be desired.

I do not limit myself to the exact construction shown for it is evident that it may be modified without lessening the scope of my invention.

What I claim is:

1. In an implement of the type described, the combination of a frame including a central longitudinal beam, front and rear supporting wheels, and front and rear gangs of cultivating devices carried by the frame and adjustable relative to each other longitudinally of the beam.

2. In an implement of the type described, the combination of a frame including a central longitudinal beam, front and rear supporting wheels, and forward and rear gangs of cultivating devices carried by the frame, the rear gangs being adjustable toward the forward gangs longitudinally of the beam.

3. In an implement of the type described, the combination of a frame including a central longitudinal beam, front and rear supporting wheels, and forward and rear gangs of cultivating devices carried by the frame, the rear wheels and gangs being simultaneously adjustable forwardly on the beam.

4. In an implement of the type described, the combination of a frame including a central longitudinal beam, front and rear supporting wheels, and forward and rear gangs of cultivating devices carried by the frame, the rear wheels and gangs being simultaneously adjustable forwardly along the beam, and means to raise or lower said rear gangs irrespective of said adjustment.

5. In an implement of the type described, the combination of a frame including a central longitudinally movable beam, front supporting wheels on the beam, and rear supporting wheels and gangs of cultivating devices carried on the rear of the beam and longitudinally adjustable thereon.

6. In an implement of the type described, the combination of a frame including a central longitudinally movable beam, front supporting wheels on the beam, rear supporting wheels and rear gangs of cultivating devices carried on the beam, gangs of cultivating devices carried forwardly on the beam, said beam being movable forwardly or rearwardly to change the relative position of the forward and rear gangs.

7. In an implement of the type described, the combination of a frame including a central longitudinal beam, front supporting wheels therefor, a rear arch mounted on the beam and adjustable longitudinally thereof, an axle rotatably mounted on said arch, supporting wheels journaled on said axle, and gangs of cultivating devices on the axle.

8. In an implement of the type described, the combination of a frame including a central longitudinally movable beam, front supporting wheels therefor, a rear arch mounted on the beam and adjustable longitudinally thereof, an axle rockably mounted on said arch, supporting wheels and gangs of cultivating devices on said axle, and a seat supported on said arch.

9. In an implement of the type described, the combination of a frame including a central longitudinal beam, front supporting wheels therefor, a rear arch mounted on the beam and adjustable longitudinally thereof, an axle rockably mounted on said arch, supporting wheels and gangs of cultivating devices on said axle, a seat supported on said arch, a front arch secured to the frame, a transverse shaft journaled on the front arch, and cultivating devices mounted on said shaft, said arches adjustable toward or from each other.

10. In an implement of the type described, the combination of a frame including a central longitudinally adjustable beam, means to support said frame and beam, and cultivating devices carried by the frame and adjustable longitudinally of the beam.

11. In an implement of the type described, the combination of a frame including a central longitudinally adjustable beam, front and rear supports therefor, and cultivating devices carried by the frame and adjustable longitudinally of the beam.

12. In an implement of the type described, the combination of a frame including a central longitudinally adjustable beam, front and rear supports therefor, and forward and rear gangs of cultivating devices carried by the frame and adjustable relative to each other longitudinally of the beam.

13. In an implement of the type described, the combination of a frame including a central longitudinally adjustable beam, gangs of cultivating devices, and a truck supporting the forward end of the beam and adjustable therewith.

14. In an implement of the type described, the combination of a frame including a central longitudinally adjustable beam, gangs of cultivating devices, and front and rear supporting trucks adjustable relative to each other.

15. In an implement of the type described, the combination of a frame including a central longitudinally adjustable beam, gangs of cultivating devices carried by the frame and adjustable longitudinally thereon, and a truck supporting the forward end of the beam and adjustable with the beam.

16. In an implement of the type described, the combination of a frame including a central longitudinally adjustable beam, gangs of cultivating devices, a rear supporting truck adjustable longitudinally of the beam, and a front supporting truck adjustable longitudinally with the beam.

17. In an implement of the type described, the combination of a frame including a central longitudinal beam, means supporting the beam, and front and rear gangs of cultivating devices carried by the beam and adjustable relative to each other longitudinally of the beam.

WALTER H. SILVER.